(12) United States Patent
Müller

(10) Patent No.: US 12,459,211 B2
(45) Date of Patent: Nov. 4, 2025

(54) METHOD FOR CONNECTING WORKPIECES, AND ASSEMBLED OBJECT

(71) Applicant: Telsonic Holding AG, Bronschhofen (CH)

(72) Inventor: Ralf Müller, Stein (CH)

(73) Assignee: Telsonic Holding AG, Bronschhofen (CH)

( * ) Notice: Subject to any disclaimer, the term of this patent is extended or adjusted under 35 U.S.C. 154(b) by 449 days.

(21) Appl. No.: 17/784,207

(22) PCT Filed: Nov. 25, 2020

(86) PCT No.: PCT/EP2020/083369
§ 371 (c)(1),
(2) Date: Jun. 10, 2022

(87) PCT Pub. No.: WO2021/115788
PCT Pub. Date: Jun. 17, 2021

(65) Prior Publication Data
US 2023/0001648 A1    Jan. 5, 2023

(30) Foreign Application Priority Data

Dec. 11, 2019   (EP) .................................... 19215157

(51) Int. Cl.
 *B29C 65/08* (2006.01)
 *B29K 705/02* (2006.01)
 *B29L 31/00* (2006.01)

(52) U.S. Cl.
 CPC ........ *B29C 65/082* (2013.01); *B29K 2705/02* (2013.01); *B29L 2031/712* (2013.01)

(58) Field of Classification Search
 CPC ............ B29C 65/082; B29C 66/53247; B29C 66/30223; B29C 66/47421
 See application file for complete search history.

(56) References Cited

U.S. PATENT DOCUMENTS 3,947,307 A * 3/1976 Buchscheidt ..... B29C 66/30223
156/580.2
4,207,989 A * 6/1980 Ingemann ............. B29C 66/542
220/270

(Continued)

FOREIGN PATENT DOCUMENTS

DE    10 2010 003 268 A1    9/2011
EP          1410988 B1 * 11/2008    ........... B29C 65/082

(Continued)

OTHER PUBLICATIONS

Chinese Office Action Corresponding to 202080094564.X dated Feb. 24, 2024.

(Continued)

*Primary Examiner* — Daniel Mcnally
(74) *Attorney, Agent, or Firm* — Finch & Maloney PLLC

(57) ABSTRACT

Two workpieces 30, 40 are joined by means of ultrasound. First, a workpiece 30 with at least one energy direction sensor 31 and a second workpiece 40 are provided. The workpieces are brought into contact with each other in such a way that the energy direction sensor 31 comes into contact with a first surface 41 of the second workpiece 40. Ultrasonic vibrations are then introduced into one of the workpieces 40 via a working surface 11 of a sonotrode 10. A sonotrode 10 is used, which has a contour with contact lines 12 on the working surface 11. The sonotrode 10 is positioned with respect to the first workpiece 30 in such a way that the contact lines 12 run transversely to the energy direction generator 31.

11 Claims, 12 Drawing Sheets

(56) References Cited

U.S. PATENT DOCUMENTS

Figure 1:
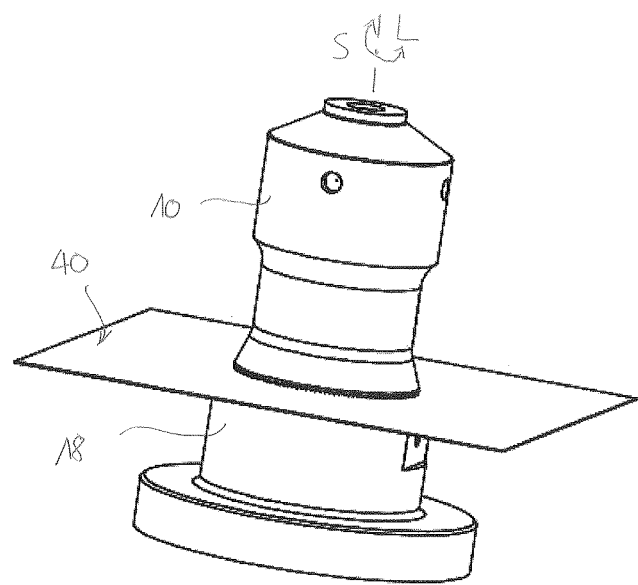

| | | | |
|---|---|---|---|
| 5,152,438 A | 10/1992 | Gordon et al. | |
| 5,244,520 A | 9/1993 | Gordon et al. | |
| 8,986,478 B2 | 3/2015 | Bücker et al. | |
| 10,906,250 B2 | 2/2021 | Regenberg | |
| 2004/0139697 A1* | 7/2004 | Reddy | B29C 66/131 |
| | | | 53/412 |
| 2013/0139955 A1 | 6/2013 | Regenberg et al. | |
| 2015/0307235 A1 | 10/2015 | Docherty et al. | |

FOREIGN PATENT DOCUMENTS

| | | | |
|---|---|---|---|
| JP | H11-25644 A | 1/1999 | |
| JP | 2000-079638 A | 3/2000 | |
| WO | WO-2011003891 A1 * | 1/2011 | B29C 65/082 |
| WO | 2018/171896 A1 | 9/2018 | |

OTHER PUBLICATIONS

Written Opinion Corresponding to PCT/EP2020/083369 mailed May 21, 2021.
European Search Report Corresponding to 19215157.9 mailed May 25, 2020.
W. Land et al, "Erfahrungen beim Schweissen von Formteilen aus Thermoplasten", Kunststoffe, Bd. Nr. 6, June 1,. 1985, pp. 315-320, See International Search.
International Search Report Corresponding to PCT/EP2020/083369 mailed May 21, 2021.

* cited by examiner

METHOD FOR CONNECTING WORKPIECES, AND ASSEMBLED OBJECT

The invention relates to a method for joining workpieces and a composite article having the features of the generic term of the independent patent claims.

In many fields of application, workpieces have to be joined together. For example, the joining of plastic parts is conceivable, for example in the field of packaging, in automotive engineering or in the manufacture of medical devices. In some cases, metallic workpieces also have to be joined together, for example contact parts with electrical conductors.

It is known to introduce ultrasonic vibrations into the workpieces to join them. The ultrasonic vibrations that are introduced produce ultrasonic welds that join the workpieces together.

However, it is not always possible to produce satisfactory ultrasonic welds, especially with different material combinations. Particularly with workpieces made of plastic materials that have different melting points, welding can be difficult. One way of achieving welding results with satisfactory properties even with different combinations of materials is to increase the contact pressure, the welding time and/or the energy applied. However, this can lead to destruction of sensitive workpieces.

A typical application for welding workpieces made of plastic is the fastening of spouts to packaging, for example beverage packaging. The spout should be made of a material that is as oxygen-tight as possible, for example HDPE. The packaging itself consists of a body formed from a film, typically a laminate film. The laminate film has a plastic layer on its outer surface, typically of LDPE. A cardboard layer provides the desired strength.

An aluminum layer provides oxygen tightness. However, it has now been shown that when large forces are applied during welding, the aluminum layer can be destroyed. This can lead to quality problems with the packaged contents, typically a beverage. The tearing of the aluminum layer can lead to the formation of pockets and thus also to hygienic problems.

It is therefore the task of the invention to avoid the disadvantages of the known, in particular to create a process for joining workpieces, with which workpieces made of different materials can be joined together with a good welding quality. A further task of the invention is to create a composite object in which two workpieces, in particular also made of different materials, are joined together with a good welding quality.

These tasks are solved according to the invention with a method and an article having the features of the characterizing part of the independent patent claims. Preferred embodiments result from the dependent claims.

The method according to the invention is used for joining workpieces by means of ultrasound. Typically, two workpieces are joined together. However, it is also conceivable to join more than two workpieces together.

In a first step, a first tool is provided which has at least one energy direction sensor. It is known per se to provide workpieces with energy direction generators during ultrasonic welding. Ultrasonic vibrations are introduced into the workpiece in the area of the energy direction generator.

The first workpiece is typically a spout for packaging. However, other workpieces are also conceivable, for example sealing or filter membranes on injection molded parts, e.g. in medical technology. Sensor holders for accommodating sensors in automotive bumpers are also conceivable.

A second workpiece is also provided. In particular, this can be a packaging material for producing packaging. However, it is also conceivable that the second workpiece is a bumper to which a sensor holder as described above is to be applied.

The first and second workpieces are brought into contact with each other in such a way that the energy direction sensor comes into contact with a first surface of the second workpiece.

Ultrasonic vibrations are then introduced into one of the workpieces via a working surface of a sonotrode. Sonotrodes are tools subjected to ultrasonic vibrations and are known to the skilled person in many embodiments.

The ultrasonic vibrations run parallel to the surface of the workpiece, which comes into contact with the working surface of the sonotrode. In this way, heat is generated based on two different mechanisms. On the one hand, movements introduced by the sonotrode into the workpieces lead to heating inside the workpiece(s). On the other hand, friction, or movements in the area of the interface between the workpieces also lead to heat generation.

Particularly when welding plastic joining parameters, it is common practice to introduce ultrasonic vibrations in a vibration direction perpendicular to contact surfaces of the workpieces with a sonotrode. It has been shown that such vibrations can lead to damage with certain types of joining partners or that—with reduced vibration amplitude to avoid damage—no adequate welded joint can be produced. This is particularly the case with film-like joining parameters such as mono films, films made of biopolymers or multilayer composite films such as those used in the field of packaging.

A further aspect of the invention therefore relates to the use of torsional ultrasonic vibrations for joining joining partners, wherein at least one of the joining partners has, in the region of a contact surface with the other joining partner, a monofilm, a film made of a biopolymer (for example polylactate) or a multilayer film.

While such applications are particularly preferred in connection with the further aspects of the invention described below, it is understood that advantageous results-se can also be obtained with other arrangements of sonotrodes and/or energy direction generators. In particular, the use of torsional oscillations makes it possible to increase the oscillation amplitude in the area of the contact surface between the sonotrode and the joining parameter until a sufficient weld joint is produced. In the case of torsional vibrations, the amplitude can be increased by increasing the radius of the welding surface relative to an axis. A similar increase in amplitude is not readily possible for classical longitudinal vibrations perpendicular to the workpiece. Because the direction of vibration is parallel to the contact surface, an increased amplitude does not impair the workpiece/joining parameters, unlike conventional vibrations perpendicular to the contact surface.

In particular, the use of torsional ultrasonic vibrations for welding is especially advantageous when joining films with a thickness of less than 100 µm, in particular of about 50 µm.

According to the invention, a sonotrode is used which has a contour with contact lines on its working surface. The sonotrode is positioned with respect to the first workpiece so that the contact lines run transversely to the energy direction generator. Transverse typically means at an angle of +/−45°, preferably about 85°-95°, particularly preferably about 90°. In this way, sound is introduced into the workpieces, especially into the second workpiece, only at points of intersection between the contact lines and the energy direction sensor. As a result, the load on the second workpiece in particular is lower. Destruction by the applied force is avoided because the overall force is lower due to the limitation of the force application to the crossing points.

Preferably, the working surface of the horn is brought into contact with a second surface of the second workpiece which is opposite to the first surface, i.e. the surface which comes into contact with the energy direction generator.

Typically, therefore, the second workpiece, for example a film of a packaging material, is brought into contact with the working surface of the sonotrode.

According to a preferred embodiment, a sonotrode is used in which the working surface is circular. However, depending on the shape of the workpiece, other shapes of the working surface of the sonotrode are also conceivable. In this case, the contact lines are arranged in a star shape on the working surface with reference to a center. The working surface does not have to comprise a complete circle but can also be circular.

Depending on the workpieces to be joined, it is also conceivable that sonotrodes have working surfaces that lie on a rectangle or a square. In this case, the contact lines usually run transversely to a direction of oscillation of the sonotrode, so that there is an entrainment effect due to the oscillations. The angle of the contact lines in relation to the contour of the workpieces and in particular of the energy direction sensor can therefore not be constant, especially in the case of torsional vibrations. In the case of torsional vibrations in particular, it is therefore advisable for the contact lines to be star-shaped. In the case of longitudinal vibrations, contact lines that are parallel to each other are also conceivable, each of which then runs transverse to a direction of vibration.

Preferably, a sonotrode is used in which the contact lines are formed on a rib between two adjacent depressions. Typically, the working surface of the sonotrode can be provided with a Hirth serration which forms the contact lines on the ribs.

Preferably, the cross-section of the rib is constant in a plane perpendicular to the radial direction in a welding area as seen in the radial direction. This ensures that the working surface acting on the corresponding workpiece with the con-tact grooves remains the same, even if the workpiece is not precisely positioned in relation to the working surface of the horn. Particularly in the case of circular workpieces and circular working surfaces of the sonotrode, it is conceivable that there is no perfect alignment, i.e. agreement between the axes of the workpiece and the sonotrode. In the case of imperfect alignment, a cross-section of the rib that remains constant in the radial direction in the welding area ensures that the shape of the contact lines at the point of contact with the workpiece in the area of the energy direction generator is always the same.

Typically, the rib is V-shaped in cross-section in a plane perpendicular to the radial direction. The angle between two legs of the V-shaped cross section is typically 40°-70°, in particular 60°. The height of the rib, i.e. a distance between the contact lines and a base of the recesses, can typically be 0.1 mm to 1.5 mm, preferably 0.4 to 1 mm. Particularly preferably, the distance is about 0.6 mm.

The contact lines have a distance from each other of about 0.1 to 2.5, preferably 0.8 to 2 mm. Preferably, they are spaced apart by about 1 mm. It goes without saying that these dimensions can change depending on the size of the workpieces to be welded.

Preferably, the energy direction sensor is designed as a circumferential elevation. Typically, the energy direction sensor is arranged on a circle or at least partially on a circle. This is particularly preferred if the first workpiece is also circular, for example shaped as a spout.

According to a particularly preferred embodiment, an energy direction sensor is used which, viewed in cross-section, has a relatively wide contact surface for contacting the other workpiece. Energy direction sensors known from the prior art are often provided with a cross-section of approximately triangular shape. It has been shown that the use of an energy director with a trapezoidal cross-section and a relatively wide contact surface can prevent damage to the second workpiece, particularly in the case of second workpieces in the form of laminates, foils and membranes. This is particularly relevant in packaging applications. According to a further aspect, the energy direction generator is therefore preferably trapezoidal in cross-section and in particular provided with a contact surface having a width which is at least five times as large, preferably at least seven times as large as the height of the energy direction generator.

In traditional welding processes with oscillation directions perpendicular to the contact surface of a joining parameter, an energy direction sensor with a triangular cross-section and a contact area that is as sharp as possible is used. In torsional welding, welding is often carried out on a flat surface, so that an energy direction sensor can be dispensed with completely. By using an energy direction sensor with a wide contact area according to the invention, the welded joint in torsional welding can be optimized without the risk of the energy direction sensor penetrating the other joining partner.

In traditional longitudinal welding processes, it is not possible to apply sufficiently high energy to the film without destroying it. It has therefore been assumed up to now that mono-films cannot be reliably welded with ultrasound. However, mono-films can also be welded with ultrasonic oscillations parallel to acoustic input surfaces, in particular torsional ultrasonic oscillations. Pressure peaks, which occur due to sharp energy direction generators in longitudinal welding processes and lead to destruction of the monofilm, are not necessary in torsional or other linear welding processes. However, energy direction sensors can still be used if they have a sufficiently large contact area. Similar advantages arise with materials made of biopolymers. Otherwise, there is also the problem of destroying the material when it is heated.

The contact lines are preferably arranged at an angle of 90° with respect to the energy direction sensor. This results in particularly precisely defined points of sound introduction.

The ultrasonic vibrations can be introduced as torsional vibrations, as longitudinal vibrations or as combinations of torsional and longitudinal vibrations. The generation of such oscillations is known to the skilled person. Particularly preferred is a combination of torsional and longitudinal vibrations generated by a sonotrode as described in the pending application EP 1920953201 of the same applicant. The contents of that application are incorporated by cross-reference into the present application.

Particularly preferably, workpieces are provided which consist of different materials or have different materials. In particular, the first workpiece consists of HDPE at least in the area of the energy direction generator. The second workpiece has LDPE at least on its first surface.

It has been shown that it is particularly advantageous if the first workpiece is placed with its side facing away from the energy direction sensor on a receptacle which has a receptacle surface which is also provided with contact lines. Such receptacles are often referred to as an anvil. An anvil with contact surfaces additionally ensures that as little friction as possible is generated between the anvil and the workpiece, so that the heat generated due to friction is generated in particular in the region of the interfaces between the first and second workpiece. Particularly preferably, the contour of the support surface is the same as the contour described above in connection with the sonotrode. However, other dimensions or shapes of ribs are also conceivable.

It has been shown that relatively short welding times are possible due to the optimized energy input. Typically, a welding process during a welding time of 50 to 60 milliseconds is sufficient, for example, to weld a spout of plastic material onto a flat packaging material. A longer welding could result in damage to the packing material, even if the arrangement according to the invention is used with relatively wide energy direction generators and specifically arranged contact lines. Therefore, it is preferred to use a generator to produce ultrasonic vibrations, which allows very precise control of the welding times. In particular, it should be possible to set welding times to an accuracy of at least 5 milliseconds. When using torsional or longitudinal vibrations parallel to the interface between the first and second workpiece, sufficient energy is nevertheless introduced into the workpieces so that a reliable joint is possible even with a short welding time.

According to another aspect of the present invention, a method is provided in which a first and a second workpiece are also provided and brought into contact in the manner described above and in which ultrasonic vibrations are introduced into one of the workpieces via a working surface of the sonotrode. According to this aspect of the invention, ultrasonic vibrations are introduced into the first or into the second workpiece in the region of the energy direction generator in at least one sound introduction point. Starting from the sound introduction point, melting of the material of at least one of the workpieces takes place up to a welding zone which is spaced from the sound introduction point. By the selective introduction of vibrations in sound introduction points which are distant from the actual welding zone, a satisfactory weld can be produced even if the workpiece is impaired in the sound introduction points due to the contact between the workpiece and the sonotrode.

According to still another aspect of the invention, a composite article is proposed. The article is typically composed of a first workpiece and a second workpiece. Typically, the assembly is performed by a method as described above. In particular, the article is a package. For example, the first workpiece is a spout, typically injection molded. The second workpiece is typically a multilayer packaging film. Such films are known per se and have layers of aluminum, cardboard, and plastic. However, monolayer films are also conceivable.

The first and second workpieces are joined together by means of ultra-sonic welding. The first workpiece has an energy direction sensor on a side facing the second workpiece. It is understood, however, that the energy direction sensor may disappear completely or partially in the course of the welding.

According to the invention, the object on the second workpiece has sound introduction impressions in a region along the energy direction generator. The sound introduction impressions are spaced apart from one another and separated from one another by welding zones. The sound input impressions run transversely to the energy direction sensor. By introducing sound at individual points, it is possible to work with smaller amplitudes and/or welding times as described above. This ensures that even pressure-sensitive workpieces can be welded reliably, in particular firmly and tightly, without impairment.

Another aspect of the invention relates to a composite article in which, alternatively or additionally, the energy direction sensor has an optimized cross-sectional shape. In particular, also in this embodiment, the composite article is a package comprising a first workpiece and a second workpiece. Preferably, this is an article as described above.

The first and second workpieces are joined together by ultrasonic welding. The first workpiece has an energy direction sensor on a side facing the second workpiece. In cross-section, the energy direction sensor is in particular trapezoidal and has a contact surface for connection to the second workpiece. The contact surface is in particular flat. It has a width and the energy direction sensor has a height perpendicular to the contact surface. According to this aspect of the invention, the width of the contact surface is at least five times as large, preferably at least seven times as large as the height of the energy direction generator. In particular, the width of the contact surface is about ten times as large as the height of the energy direction generator. In this way, a flat and relatively wide contact surface is provided. Penetration of the energy direction generator into a packaging material, which could be damaged by the penetration, is thus avoided. At the same time, it has been shown that an energy direction sensor with such a cross-section is sufficient to produce a reliable weld. Particularly preferably, the energy direction sensor has a width of between 0.5 mm and 2 mm, especially preferably between 0.7 mm and 1.2 mm. The height of the energy direction sensor is preferably between 0.5 mm and 1.2 mm and is preferably about 0.1 mm.

The first workpiece typically comprises or consists of a first plastic material. In particular, the material may be HDPE. The second workpiece typically has, on at least the side facing the first workpiece, a second plastic material that is different from the first plastic material. Typically, this is LDPE.

In particular, different plastic materials can be used, which have different melting points, but which are not too far apart from each other. Typically, the melting points do not differ by more than about 40°.

In particular, if the second workpiece is a laminate, the sound initiation impressions may extend substantially through an uppermost layer of the laminate. In the case of packaging films, the sound introduction impressions extend in particular through an uppermost plastic layer to the level of a cardboard layer.

Preferably, in all of the embodiment examples explained above, the energy direction transducer extends transversely to the contact lines. In particular, in connection with an energy direction sensor of the width described above, it is also conceivable that the energy direction sensor runs approximately parallel to the contact lines. Furthermore, an angle between contact lines and the energy direction sensor can also vary along the energy direction sensor. In particular, it is conceivable, for example, to use a torsion sonotrode with a circular working surface and contact lines arranged in a star shape to weld a non-circular contour, for example a square contour. In this case, for example, the angle between the energy direction generator and the contact lines may vary between 45° and 90° (45° in the region of a corner of the square and 90° in the region of the center of a side of the square).

Still another aspect of the invention relates to an alternative method for joining workpieces of different material. Particularly preferably, this process is carried out in combination with a process as described above. However, it can also be advantageously used in other contexts. According to the invention, workpieces made of different materials are joined together. A first workpiece has a first degree of crystallization at least in the region of an interface facing the second workpiece. A second workpiece has a second degree of crystallization at least in the region of an interface facing the first workpiece. The second degree of crystallization is different from the first degree of crystallization. The workpieces are subjected to torsional vibrations at a sound introduction surface, as a result of which the workpieces are bonded to one another. It has been shown that conventional longitudinal welding processes can hardly produce reliable welded joints between parts made of different materials if the workpieces have different degrees of crystallization. A sufficient weld can only be produced if the amorphous and crystalline components in the workpieces are softened at the same time during welding. In particular, workpieces with a high crystalline content require a high energy and thus also a high amplitude in order to achieve maximum energy input into the weld zone in a sufficiently short time. At the same time, in the case of longitudinal vibration introduction, a sufficiently high amplitude cannot be introduced in order not to damage workpieces with a larger amorphous content that have already been softened with lower amplitudes. This problem does not exist with torsional vibration initiation.

The effect of this aspect of the invention can be seen, for example, when welding LDPE to LDPE compared to welding LDPE to HDPE. With an amplitude of 30 µm, a joint percentage of 65% can be achieved when welding LDPE to LDPE. An amplitude of 30 µm could also be achieved with longitudinal vibration without destroying workpieces. On the other hand, an amplitude of 30 µm for a combination of LDPE with HDPE only achieves a bonding proportion of 20% (i.e. a bond between the joining partners is only formed in 20% of the volume adjacent to the interface). This is not sufficient for a reliable welded joint.

Increasing the amplitude to 40 µm causes amorphous and crystalline components to melt in both workpieces. The LDPE and HDPE materials form a sufficiently strong bond at the molecular level.

This finding makes it possible to weld different material pairings for a wide variety of applications: Conceivable applications include the welding of sensor holders in bumpers, the welding of sensor housings or the welding of aroma protection valves in packaging, e.g. for coffee.

A torsional vibration with an amplitude of at least 40 µm is therefore particularly preferred in the area of the sound-introducing surface.

The first degree of crystallization is preferably between 10% and 60% and the second degree of crystallization between 60% and 90%.

On the basis of the findings described above, the process according to the invention can be used particularly preferably for joining workpieces with LDPE and HDPE in the region of the interfaces. The workpieces can be made in one piece from LDPE or HDPE. However, it is also conceivable that they are provided with the corresponding material only in the region of the interface, as is the case, for example, with plastic-coated packaging materials (aluminum and cardboard substrate with an LDPE layer.

Still another aspect of the invention relates to a composite article comprising at least two workpieces. A first workpiece has a first degree of crystallization at least in the region of an interface facing the second workpiece. A second workpiece has, at least in the region of an interface facing the first workpiece, a second degree of crystallization which is different from the first degree of crystallization. The workpieces are connected to each other by a welded joint between the interfaces, which is generated by torsional ultrasonic vibrations. The generation by means of torsional ultrasonic vibrations can be recognized by means of sound introduction impressions arranged on the sound introduction surface, which at least partially exhibit rotational symmetry.

The invention is explained in more detail below in embodiment examples and on the basis of the drawings. They show:

FIG. 1: A perspective view of a sonotrode according to the invention with a holder for workpieces.

Figure 2:
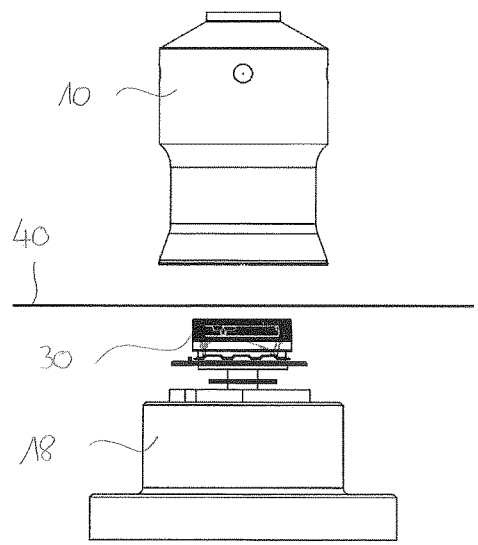

FIG. 2: A side view of the arrangement from FIG. 1 in an exploded view.

Figure 3:
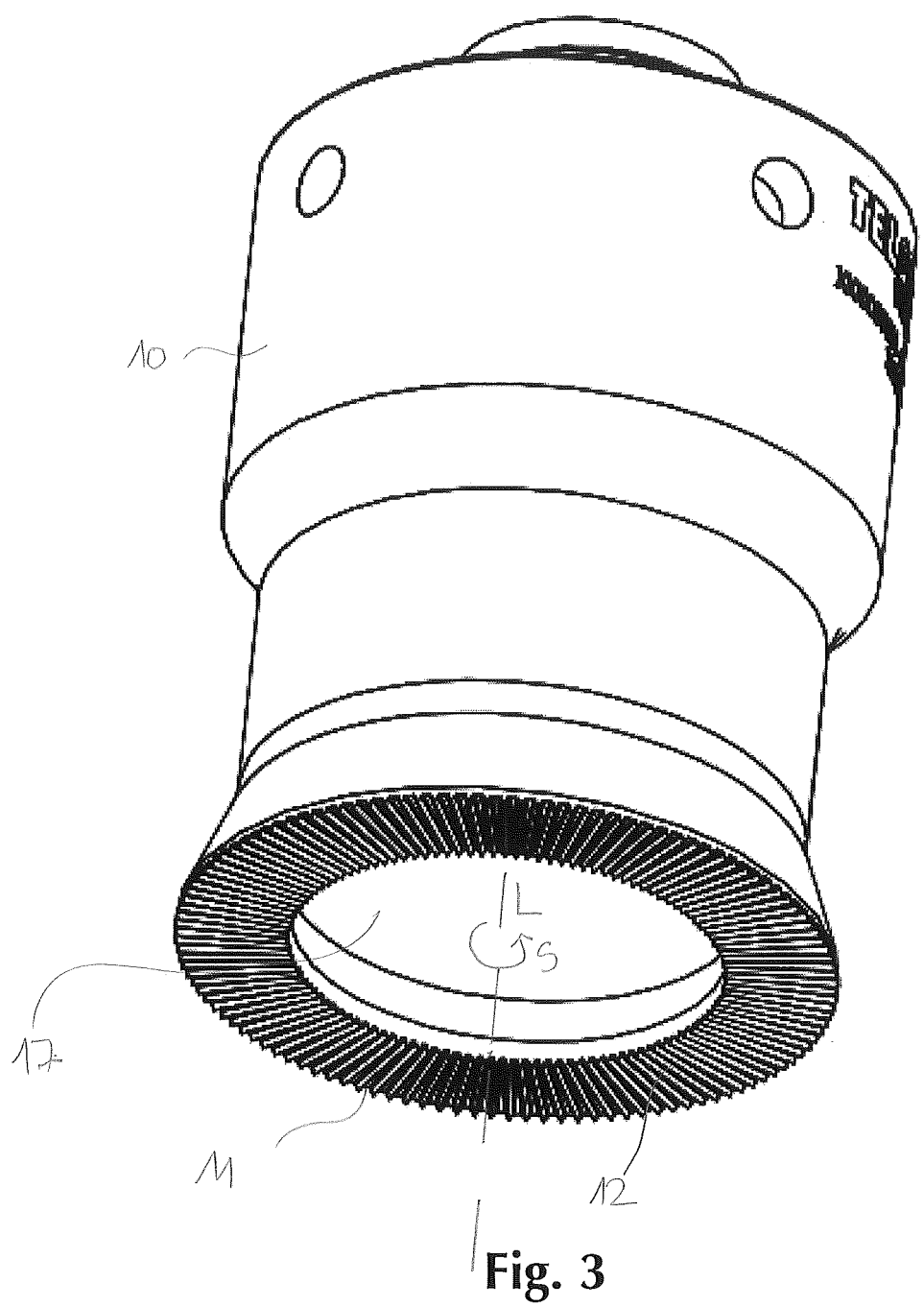

FIG. 3: Perspective view of a sonotrode according to the invention from the working surface.

Figure 4:
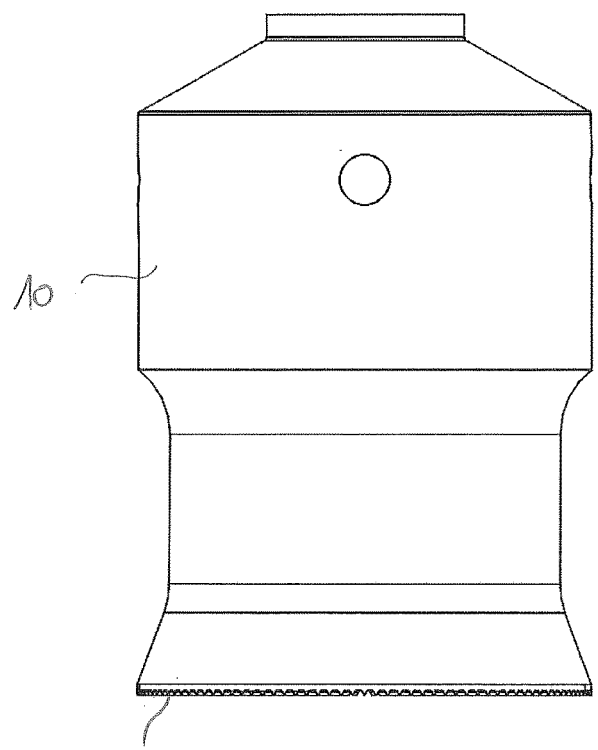

FIG. 4: A side view of a sonotrode according to the invention.

Figure 5:
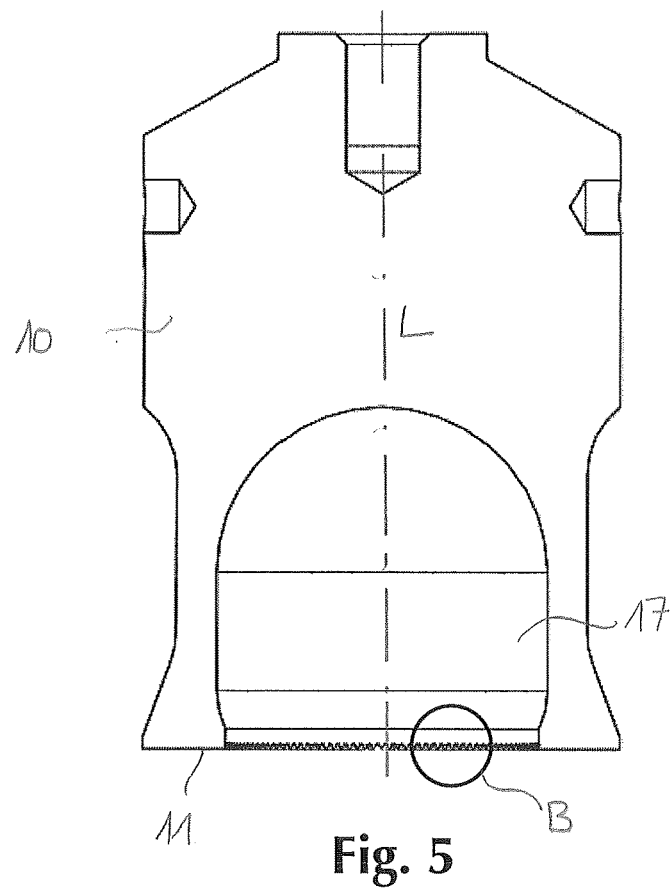

FIG. 5: A cross-section through a sonotrode according to the invention along a longitudinal axis of the sonotrode.

Figure 6:
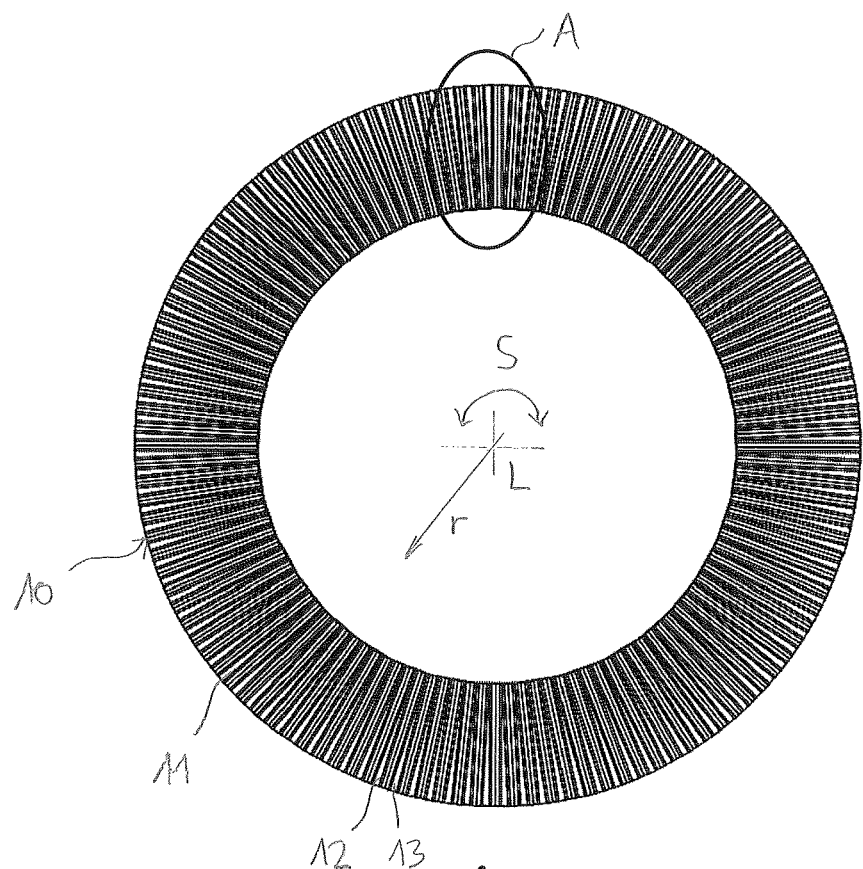

FIG. 6: A view of the working surface of a sonotrode.

Figure 7:
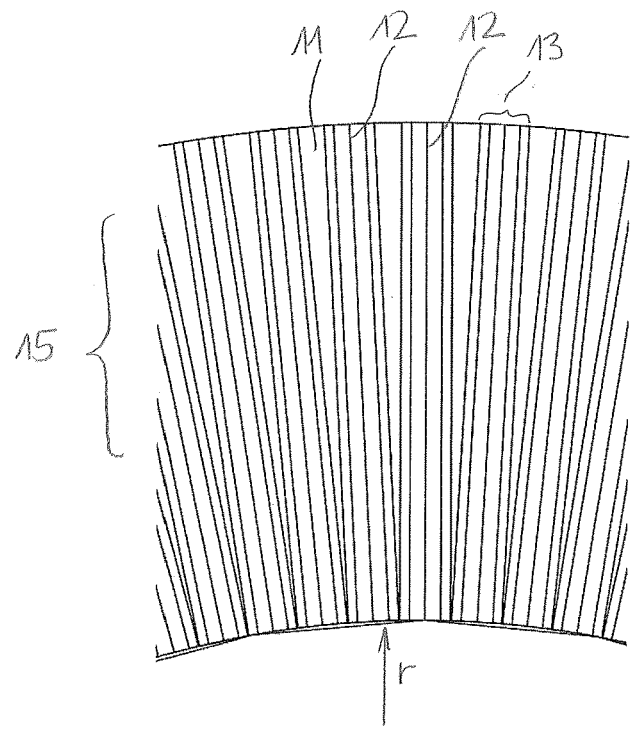

FIG. 7: An enlarged view of the section A from FIG. 6.

Figure 8:
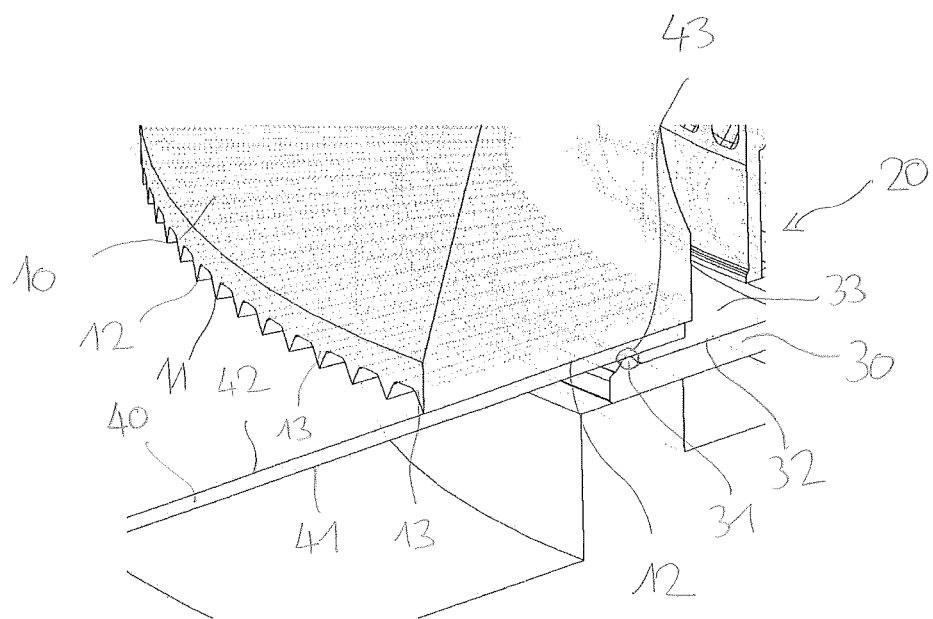

FIG. 8: An enlarged section of two workpieces, which are exposed to the working surface of a sonotrode in perspective view.

Figure 9:
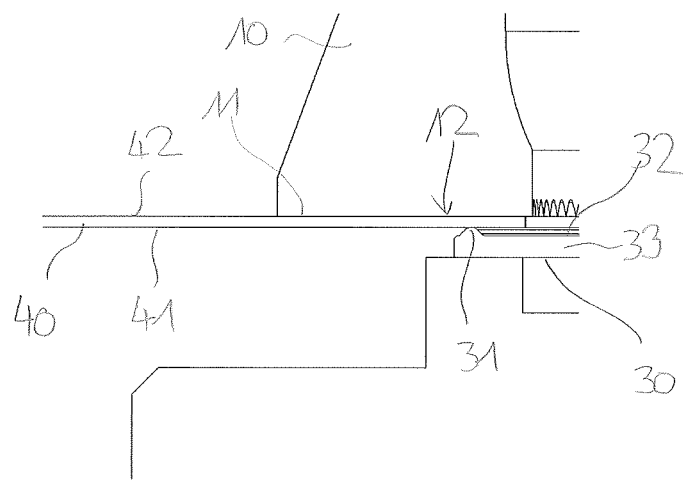

FIG. 9: A cross-sectional view in a radial plane through a sonotrode according to the invention and workpieces according to the invention.

Figure 10:
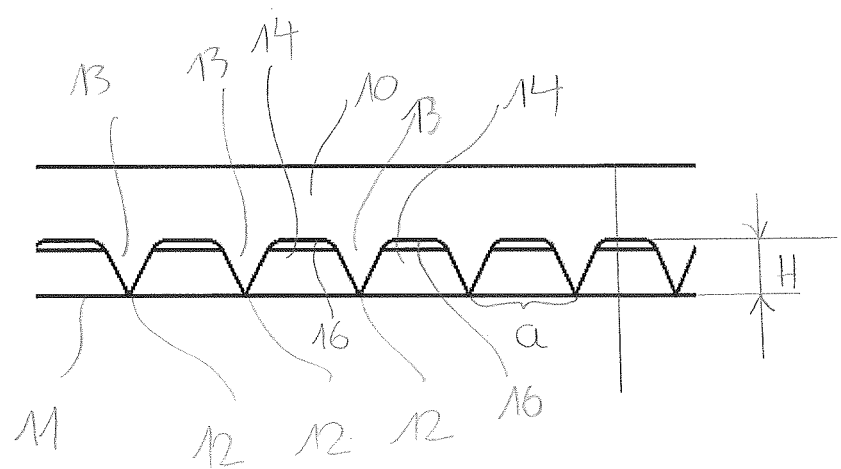

FIG. 10: A side view of the working surface of a horn according to the invention in the enlarged section B from FIG. 5.

Figure 11:
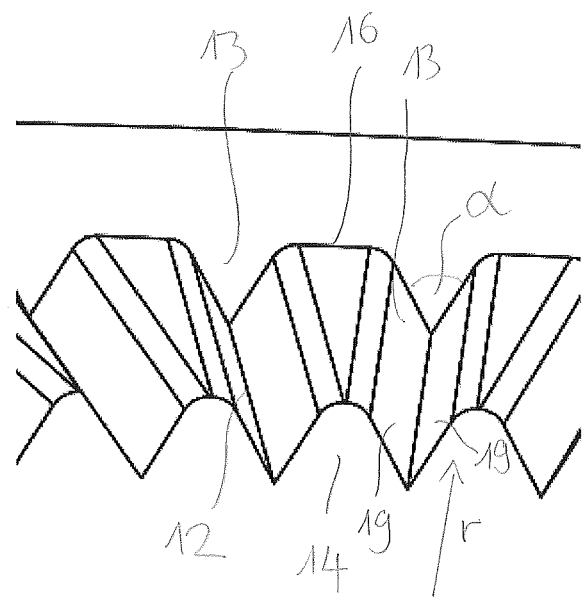

FIG. 11: A perspective view of a section of the working surface of a sonotrode.

Figure 12:
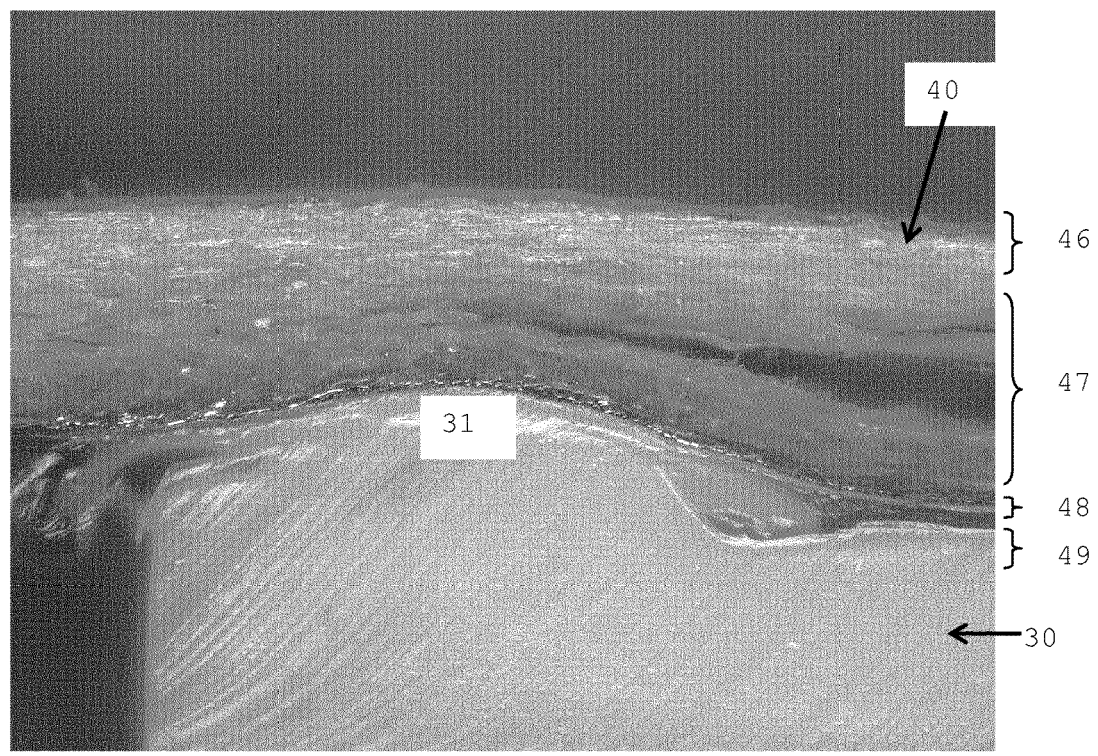

FIG. 12: A sectional view of a spout connected to a packing material in a plane perpendicular to an energy direction generator.

Figure 13:
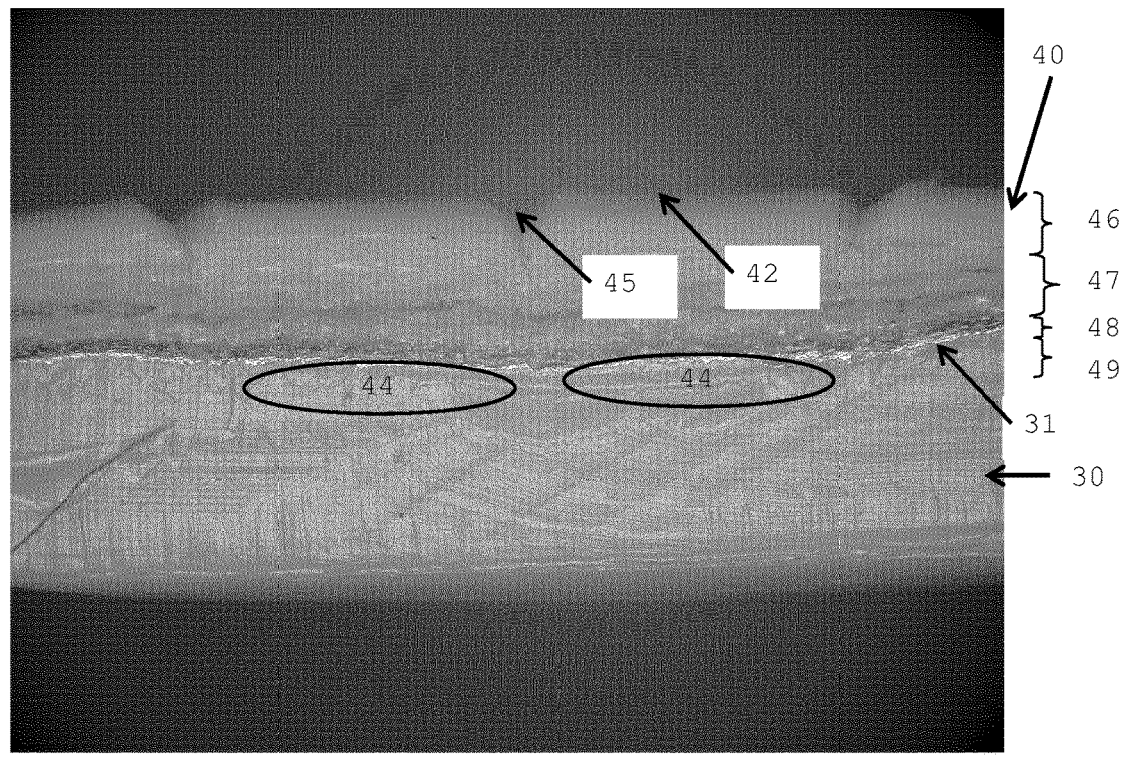

FIG. 13: A sectional view of a spout connected to a packing material along an energy direction generator.

Figure 14A:
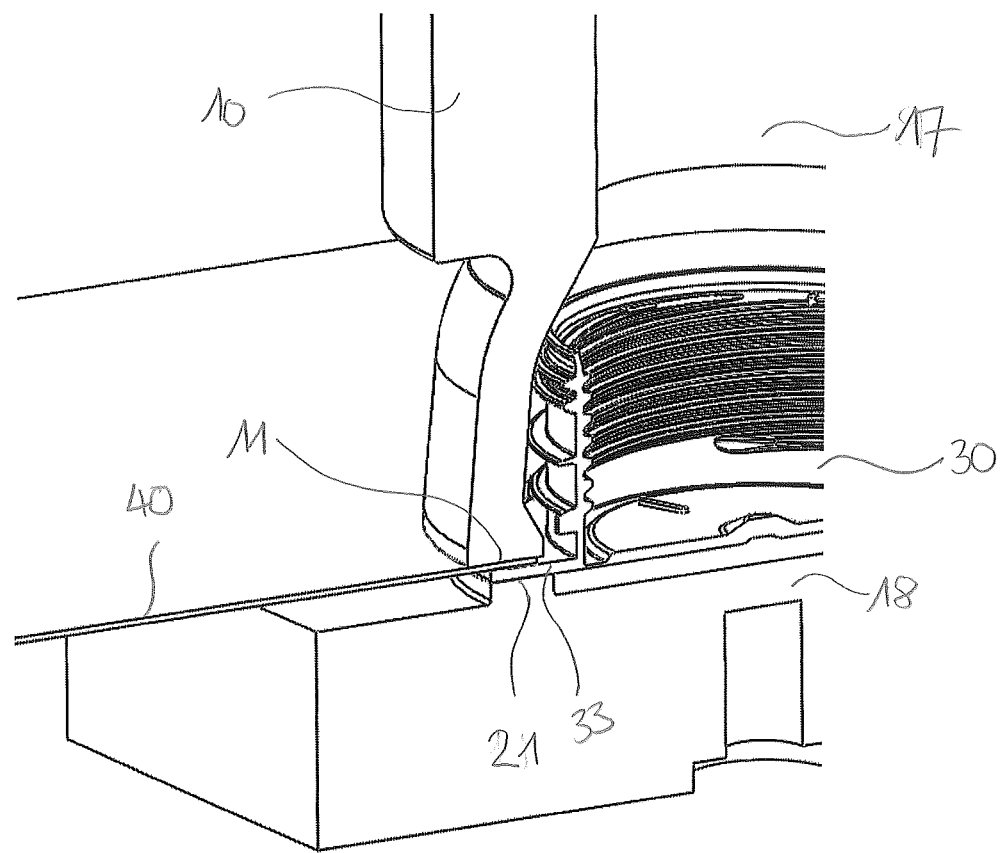

FIGS. 14a and b: An illustration of an alternative embodiment of an energy direction generator with an alternative shape of a support.

Figure 14B:
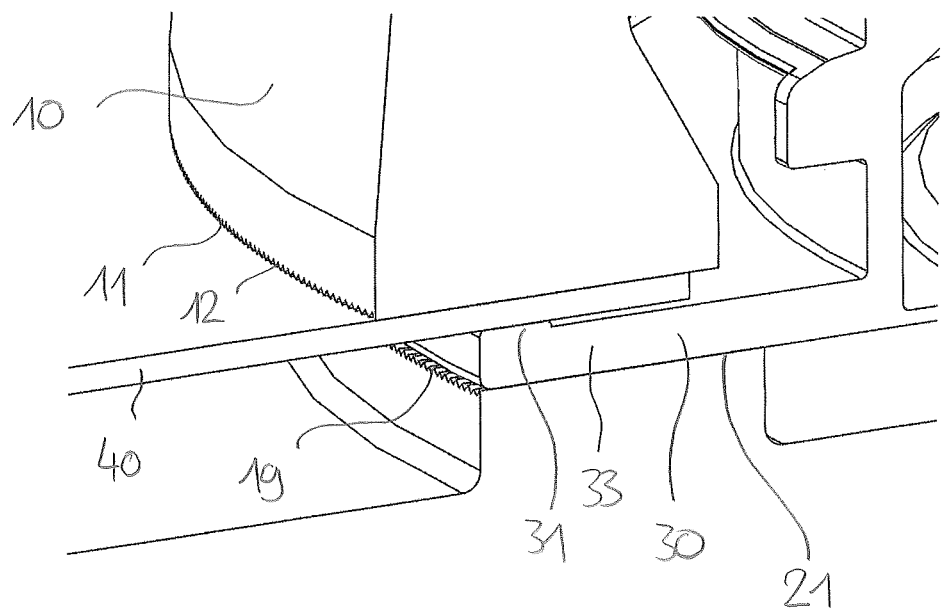
Figure 15A:
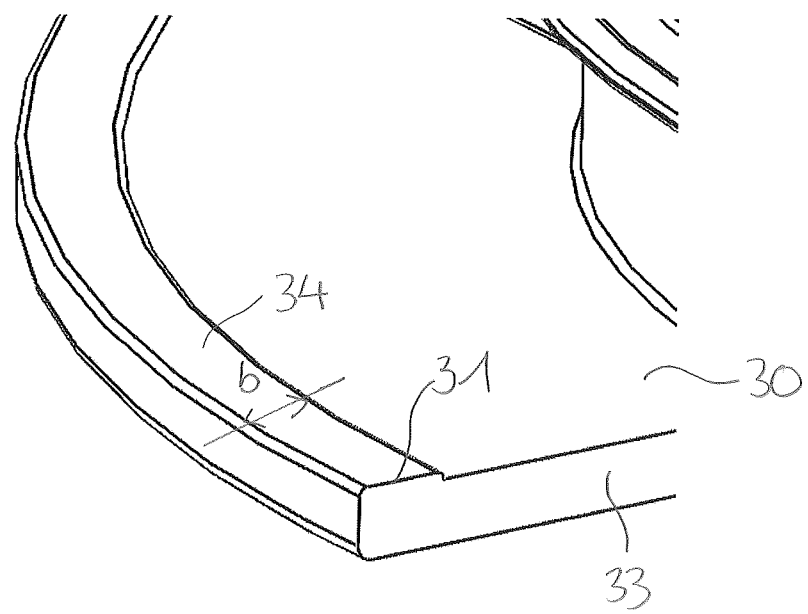

FIGS. 15a and b: An illustration of the energy direction generator of FIGS. 14a and 14b in perspective form and in cross-section.

Figure 16A:
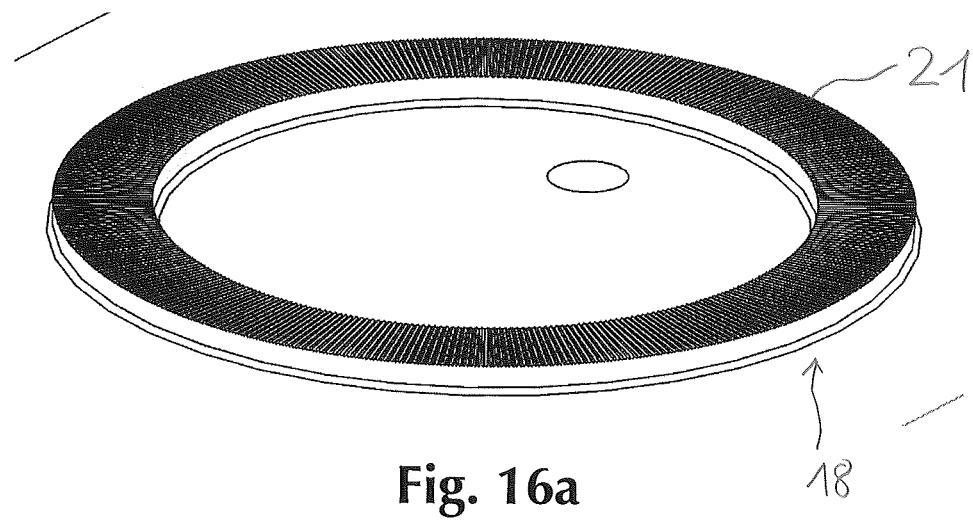

FIGS. 16a and b: A representation of a support and a support surface of an anvil in a first embodiment.

Figure 17A:
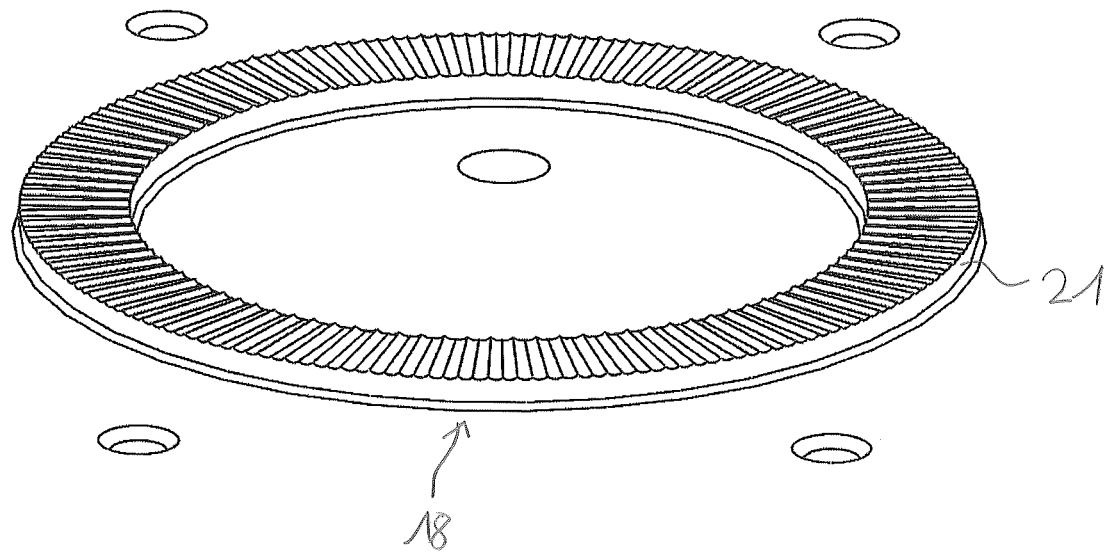

FIGS. 17a and b: A representation of a receiving surface of an anvil according to a second embodiment, and FIG. 18: A graphical representation of the bonding parts for workpieces with the same and with different crystalline parts.

FIG. 1 shows a sonotrode 10 and a receptacle 18 in perspective view. Between the sonotrode 10 and the receptacle 18 two workpieces in the form of a packaging material foil 40 and a spout (not shown in FIG. 1, see FIG. 2) are shown. The horn 10 and the holder 18 can be moved relative to each other in a manner known per se, so that the workpieces can be clamped between them. For this purpose, the sonotrode can be fixed in a machine frame, which is adjustable with a drive, typically a pneumatic drive or an electromechanical drive.

The sonotrode 10 is set into ultrasonic vibrations in a manner known per se. For this purpose, an ultrasonic generator and an ultrasonic converter are provided (not shown in FIG. 1), which are known to the person skilled in the art. The sonotrode 10 is set into torsional oscillations in a direction of oscillation S about its longitudinal axis L. The ultrasonic generator and the ultrasonic converter are known to those skilled in the art. In addition, longitudinal oscillations in longitudinal direction L can be present.

In operation, welding is performed in a manner known per se. For example, ultrasonic oscillations of 20, 30 or 35 kHz are generated. The oscillations are typically generated by a converter with piezoelectric elements known per se.

FIG. 2 shows an exploded view of the arrangement according to FIG. 1. The first workpiece in the form of a spout 30 and the second workpiece in the form of a foil of packing material 40 are arranged between the sonotrode 10 and the receptacle 18.

FIG. 3 shows a sonotrode 10 in perspective from its working surface 11. The working surface 11 is circular. Within the annular working surface 11 is a recess 17. The recess 17 forms a clearance for a contour of the spout 30. Contact lines 12 are arranged on the working surface 11 in a radial direction relative to the longitudinal axis L. The contact lines 12 extend from the longitudinal axis L to the working surface 11. The contact lines 12 extend from an inner edge of the working surface 11 to an outer edge of the working surface 11.

FIGS. 4 and 5 show the sonotrode 10 in a side view and in a cross-section along the longitudinal axis L of the sonotrode 10. In the side view it can be seen that the working surface 11 has a contoured surface in the form of a Hirth serration. FIG. 5 also shows the recess 17 for the spout 30 (not shown in FIG. 5).

FIG. 6 shows a detailed view of the working surface 11 of the sonotrode 10. The contact lines 12 are formed by ribs 13 which extend in radial direction r from the longitudinal axis L of the sonotrode 10.

FIG. 7 shows an enlarged view of the section A of FIG. 6. The ribs 13 extend in radial direction r and have the contact lines 12 on their uppermost point. The cross-section through the ribs 13 in a plane perpendicular to the radial direction r is constant over a welding area 15. The welding area 15 designates the area in which the working surface 11 of the horn 10 can come into contact with the packing material 40 in an area adjacent to an energy direction generator 31 at the spout 30 (see FIGS. 8 and 9).

FIG. 8 shows an enlarged section of a portion of the sonotrode 10, the spout 30, and the packing material 40.

The pourer 30 has a flange 33 to which the packing material 40 is to be connected. An energy direction sensor 31 is provided on the flange 33 on the side 32 facing the packing material 40. The energy direction generator has a triangular cross-section in a manner known per se.

The energy direction sensor has a height of typically 0.3 mm.

The packing material 40 has a first surface 41 which is directed towards the pouring spout 30 and in particular towards the side 32 of the flange 30. A second surface 42 of the packing material 40 is directed towards the working surface 11 of the horn.

Thereby, the contact lines 12 of the working surface 11 of the sonotrode 10 run along the second surface 42.

The sonotrode 10 is positioned with respect to the pouring spout 30 such that the contact lines 12 intersect at sound introduction points 43 at a right angle with the energy direction sensor 31. The energy direction sensor 31 is arranged on the flange 33 in a circular circumferential manner. The welded-together pouring spouts 30 and packing material 40 together form a packing 20, a section of which can be seen in FIG. 8. Typically, this packaging is food packaging, e.g. beverage packaging. However, packaging for other products, in particular liquids or bulk materials, is also conceivable.

FIG. 9 shows an illustration similar to FIG. 8 in a transverse section. The horn 10 is with its working surface 11 and its contact lines 12 in contact with the second surface 42 of the packaging material 40. The packaging material 40 contacts with the first surface 41 the pouring spout 30 in the area of the energy direction generator 31.

FIG. 10 shows an enlarged section of the working surface 11 of the horn according to section B in FIG. 5. The working surface 11 is provided with a structuring similar to a Hirth serration. As a result, ribs 13 with a V-shaped cross-section are present on the working surface 11. The tip of the V-shaped ribs forms the contact lines 12. A recess 14 with a base 16 is formed between the ribs. The height of the recess, i.e. the distance H between the contact lines 12 and the base 16 is 0.6 mm. The distance a between two adjacent contact lines 12 is 1 mm in the example shown.

FIG. 11 shows a perspective view of a section similar to FIG. 10. In FIG. 11 it can be seen that the cross-section of the ribs 13 in the radial direction r does not change substantially. On the other hand, the shape and in particular the width of the recesses 14 and their base 16 change between the individual ribs 13. The angle α between two legs 19 of the ribs 13 is 60°.

FIG. 12 shows a section through a layer of a packing material 40 which has been welded onto a spout 30. The cut is made in a direction perpendicular to the energy direction sensor 31, i.e. in a direction analogous to the cut shown in FIG. 9. The energy direction sensor 31 is still recognizable, but somewhat flattened compared to the original shape (see FIGS. 8 and 9). There is a continuous and uniform weld between the packing material 40 and the pouring spout 30.

The packaging material 40 has an aluminum layer 48 and a cardboard layer 47, which are enclosed on both sides by an LDPE layer 46. As FIG. 12 shows, the aluminum layer 48 is not damaged. The lower LDPE layer 49 is intimately bonded to the material of the spout 30, which in the example shown is HDPE.

FIG. 13 shows a cross-section through an article comprising a pourer 30 and a packing material 40 along the energy director. Again, it can be seen that the central aluminum layer 48 is undamaged. Sound injection impressions 45 are discernible on the second surface 42 of the packing material 40, which was facing the horn 10. The sound injection impressions 45 substantially penetrate the top layer 46 of LDPE and extend nearly to the cardboard layer 47. The bottom LDPE layer 49 is intimately bonded to the dispenser 30 in weld zones 44. The weld zones 44 extend between the sound injection impressions 45.

FIGS. 14a and 14b show a perspective view of a weld of a packaging material 40 to a spout 30 in a second embodiment. Similar to the embodiments described above, the spout 30 is placed with its flange 33 on a receptacle 18. The receptacle 18 has a contact surface 21 for the flange 33. The contact between the spout 30 and the packaging material 40 takes place in the area of an energy direction generator 31 (see FIG. 14b). Similar to the foregoing, the horn 10 has a recess 17 for receiving a threaded portion of the spout 30. As in previous embodiments, the working surface 11 of the sonotrode 10 is provided with contact lines 12 (see FIG. 14b).

The contact surface 21 of the receptacle 18 is provided with a corrugation 19.

Figure 15B:
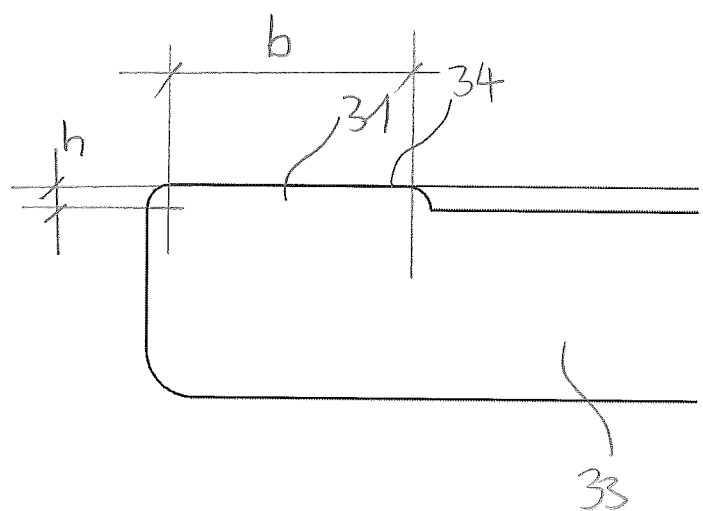

FIGS. 15a and 15b show enlarged representations of the flange 33 of the spout 30 and in particular of the energy direction sensor 31. The energy direction sensor 31 is formed as a circular contour on the flange 33. The energy direction sensor 31 has a flat circular contact surface 34 on which the packaging material 40 is placed and welded. In cross-section, the energy direction sensor is trapezoidal with rounded side flanks.

The contact surface 34 is annular and has a width b of 1 mm in the radial direction. In a direction perpendicular to the contact surface 34, the energy meter 31 has a height h of 0.1 mm. Due to the flat and relatively wide contact surface 34, penetration of the energy directing transmitter 31 into the packaging material 40 (see FIG. 14b) is prevented or at least minimized.

Figure 16B:
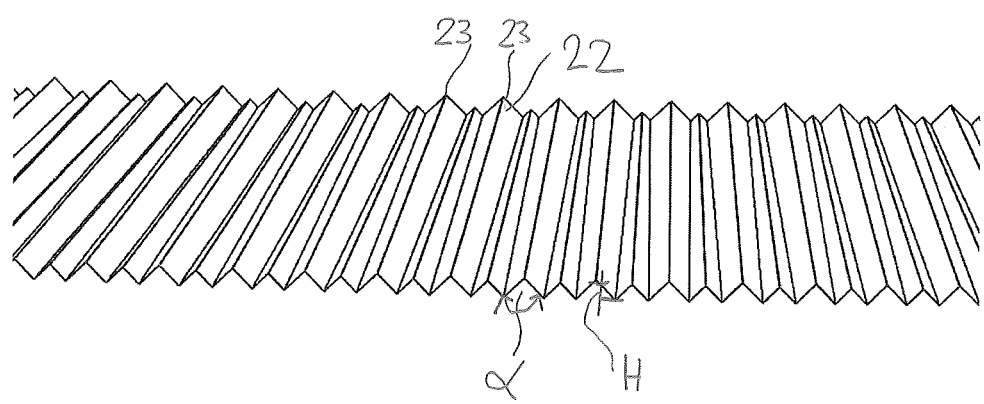

FIGS. 16a and 16b show a first embodiment of a corrugation 19 on the contact surface 21 of a receptacle 18. In the embodiment example according to FIGS. 16a and 16b, the corrugation 22 is formed similarly to the contact lines 12 of the horn 11 according to FIGS. 10 and 11, in particular with comparable angles α between legs and comparable height H between a base and the tip of the ribs. In contrast to the corrugation of the sonotrode, a further, smaller corrugation is provided between two adjacent ribs 23 in the valley bottom in order to compensate for different heights due to the circular geometry.

Figure 17B:
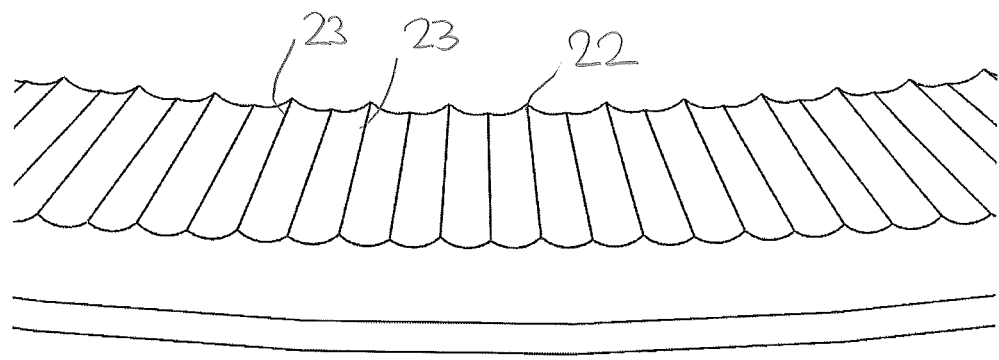

FIGS. 17a and 17b show an alternative embodiment of a support surface 21 of a receptacle 18. The ribs 23 are connected here with U-shaped valleys. Here, too, smaller ribs are provided to compensate for different heights between two adjacent ribs 23. The angles and dimensions correspond in each case as in the embodiment according to FIGS. 16a and 16b to the angles and dimensions of the associated sonotrode.

Figure 18:
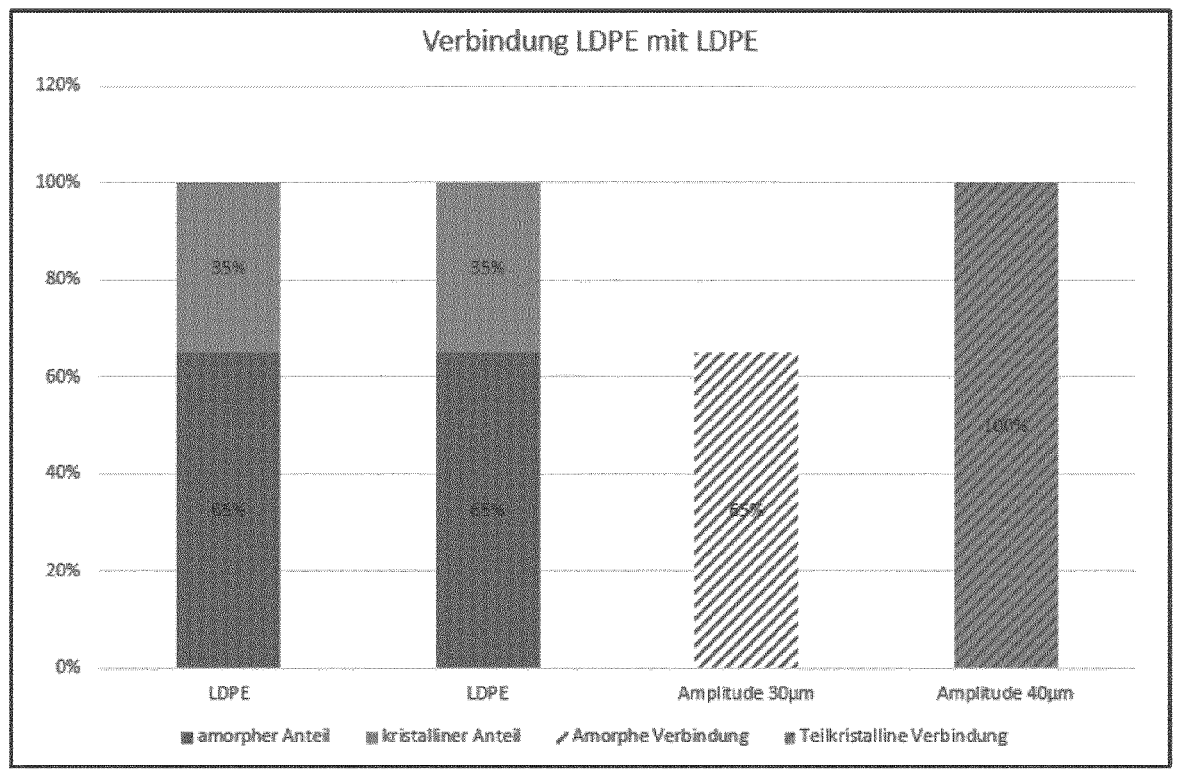
Figure 18:
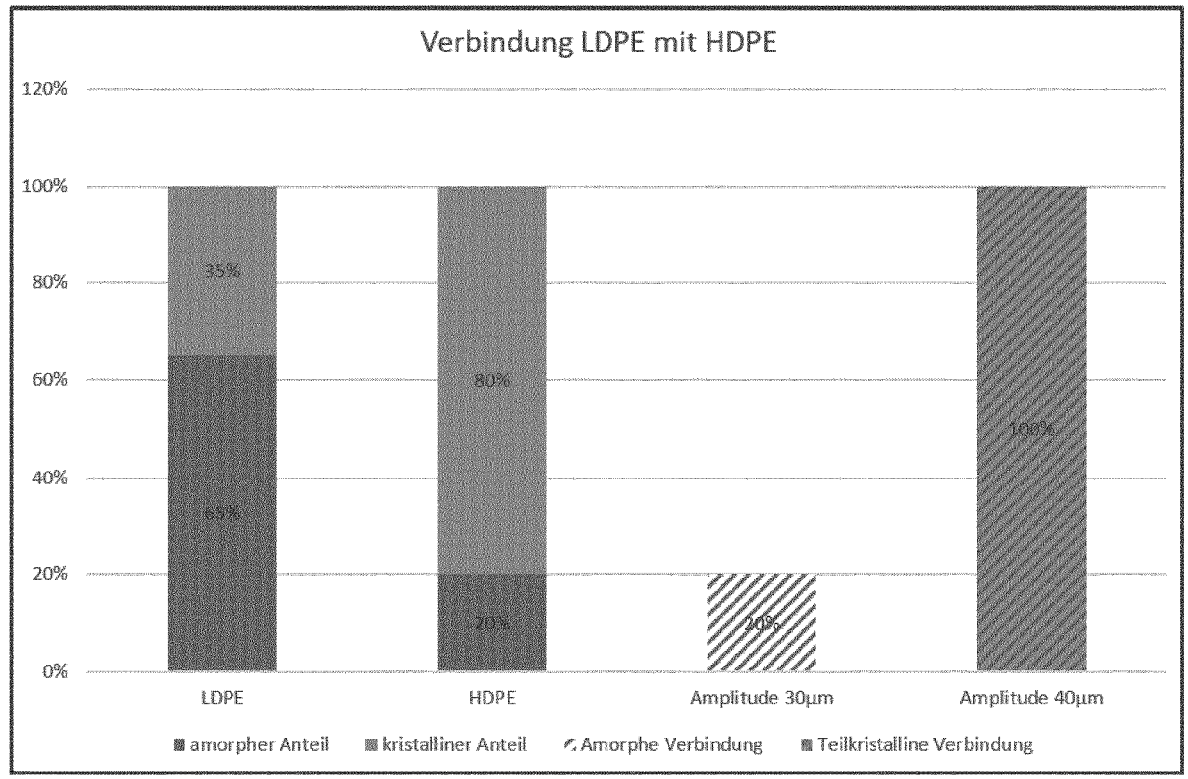

FIG. 18 shows graphical representations of tests for welding joining partners with different materials.

FIG. 18 above shows the joint between two identical plastic parts made of LDPE. FIG. 18 below shows the joining of different plastics, one part made of LDPE and one part made of HDPE. The two left-hand columns show the amorphous and crystalline proportions of the joining partners. It can be seen from this that in the lower illustration according to FIG. 18, the amorphous and crystalline portions in the two joining partners (left LDPE, right HDPE) are different.

With a longitudinally applicable amplitude of 30 μm, a sufficiently good bond with a bond content of 65% can be achieved in a bond between LDPE and LDPE (upper illustration) due to the relatively high, equal amorphous content. When the amplitude is increased to 40 μm, an almost complete bond is obtained.

In contrast, with an amplitude of 30 μm, a bond of only 20% can be achieved when LDPE is bonded to HDPE (lower illustration). This is not sufficient. However, by increasing the amplitude to 40 μm, a compound content of almost 100% can be achieved here as well. Such an amplitude can be achieved in particular with the torsional initiation described above without impairing sensitive joining partners.

The invention claimed is:

1. A composite article having a first and a second workpiece,
    wherein the first and second workpieces are joined to one another by means of ultrasonic welding, and wherein the first workpiece has an energy direction generator on a side that faces the second workpiece, wherein the article has, on the second workpiece, in a region along the energy direction generator, acoustic introduction impressions which are spaced apart from each other and separated from each other by welding lines and which extend transversely to the energy direction generator.

2. The article according to claim 1, wherein the article is a package and the first workpiece is a spout and the second workpiece is a packing material.

3. The article according to claim 1, wherein the first workpiece has a first plastic material and wherein the second workpiece has, on its side facing the first workpiece, a second plastic material which is different from the first plastic material.

4. The article according to claim 1, wherein the second workpiece is a laminate and the sound introduction impressions extend substantially through an uppermost layer of the laminate.

5. A method for joining workpieces of different material,
    wherein a first workpiece has a first degree of crystallization at least in the region of an interface facing the second workpiece, a second workpiece has a second degree of crystallization at least in the region of an interface facing the first workpiece, which degree of crystallization is different from the first degree of crystallization,
    wherein at least one of the workpieces is subjected to torsional vibrations at a sound introduction surface and the workpieces are thereby bonded to one another.

6. The method according to claim 5, wherein the first degree of crystallization is between 10% and 60% and the second degree of crystallization is between 60% and 90%.

7. The method of claim 6, wherein the first workpiece comprises LDPE at least in the region of the interface with the second workpiece, and wherein the second workpiece comprises HDPE at least in the region of the interface with the first workpiece.

8. The method according to claim 5, wherein a torsional vibration with an amplitude of at least 40 micrometers is introduced in the region of the sound introduction surface.

9. A composite article comprising a first and a second workpiece,
    wherein a first workpiece has a first degree of crystallization at least in the region of an interface facing the second workpiece, a second workpiece has a second degree of crystallization at least in the region of an interface facing the first workpiece, which degree of crystallization is different from the first degree of crystallization,
    wherein the workpieces are joined to one another by a welded joint between the interfaces produced by means of torsional ultrasonic vibrations.

10. The article of claim 9, wherein the first degree of crystallization is between 10% and 60% and the second degree of crystallization is between 60% and 90%.

11. The article of claim 10, wherein the first workpiece comprises LDPE at least in the region of the interface with the second workpiece and wherein the second workpiece comprises HDPE at least in the region of the interface with the first workpiece.

* * * * *